(12) United States Patent
Hildebrand et al.

(10) Patent No.: US 10,176,128 B2
(45) Date of Patent: Jan. 8, 2019

(54) COMMUNICATION SYSTEM FOR INTER-CHIP COMMUNICATION

(71) Applicant: CONTINENTAL AUTOMOTIVE GMBH, Hannover (DE)

(72) Inventors: Torsten Hildebrand, Lich (DE); Jörn Thiele, Giessen (DE); Jörg Scheuermann, Solms (DE)

(73) Assignee: Continental Automotive GmbH, Hannover (DE)

( * ) Notice: Subject to any disclaimer, the term of this patent is extended or adjusted under 35 U.S.C. 154(b) by 137 days.

(21) Appl. No.: 15/026,498

(22) PCT Filed: Sep. 25, 2014

(86) PCT No.: PCT/EP2014/070498
§ 371 (c)(1),
(2) Date: Mar. 31, 2016

(87) PCT Pub. No.: WO2015/049158
PCT Pub. Date: Apr. 9, 2015

(65) Prior Publication Data
US 2016/0246743 A1 Aug. 25, 2016

(30) Foreign Application Priority Data
Oct. 2, 2013 (DE) .................. 10 2013 220 077

(51) Int. Cl.
*G06F 13/00* (2006.01)
*G06F 13/364* (2006.01)
(Continued)

(52) U.S. Cl.
CPC ............ *G06F 13/364* (2013.01); *G06F 13/24* (2013.01); *G06F 13/4282* (2013.01); *G06F 13/4286* (2013.01); *G06F 15/17* (2013.01)

(58) Field of Classification Search
None
See application file for complete search history.

(56) References Cited

U.S. PATENT DOCUMENTS

| 5,737,633 A | 4/1998 | Suzuki |
| 2002/0120795 A1* | 8/2002 | Charlier .............. G06F 13/4291 710/33 |

(Continued)

FOREIGN PATENT DOCUMENTS

| CN | 1373428 | 10/2002 |
| GB | 2 407 662 | 5/2005 |

OTHER PUBLICATIONS

Serial Peripheral Interface Bus, Wikipedia, the free encyclopedia <http://en.wikipedia.org/w/index.php? title=Serial_Peripheral_Interface_Bus&oldid=574365309> am Sep. 24, 2013.

*Primary Examiner* — Henry Tsai
*Assistant Examiner* — Dean Phan
(74) *Attorney, Agent, or Firm* — Cozen O'Connor

(57) ABSTRACT

A communication system for inter-chip communication includes system processors that communicate with one another via data channels of a communication bus. A processor designated as a master processor assumes control of the transmission to the other processor designated as a slave processor. A data channel is operated in a separate physical communication bus for each data communication direction.

5 Claims, 1 Drawing Sheet

(51) Int. Cl.
*G06F 13/42* (2006.01)
*G06F 13/24* (2006.01)
*G06F 15/17* (2006.01)

(56) References Cited

U.S. PATENT DOCUMENTS

| | | |
|---|---|---|
| 2006/0143348 A1 | 6/2006 | Wilson et al. |
| 2006/0277346 A1* | 12/2006 | Doak .................. G06F 13/387 710/305 |
| 2008/0222320 A1 | 9/2008 | Suganuma |
| 2009/0248932 A1 | 10/2009 | Taylor et al. |
| 2012/0059489 A1* | 3/2012 | Martchovsky ...... G06F 13/4286 700/3 |
| 2013/0195210 A1 | 8/2013 | Swarbrick et al. |

* cited by examiner

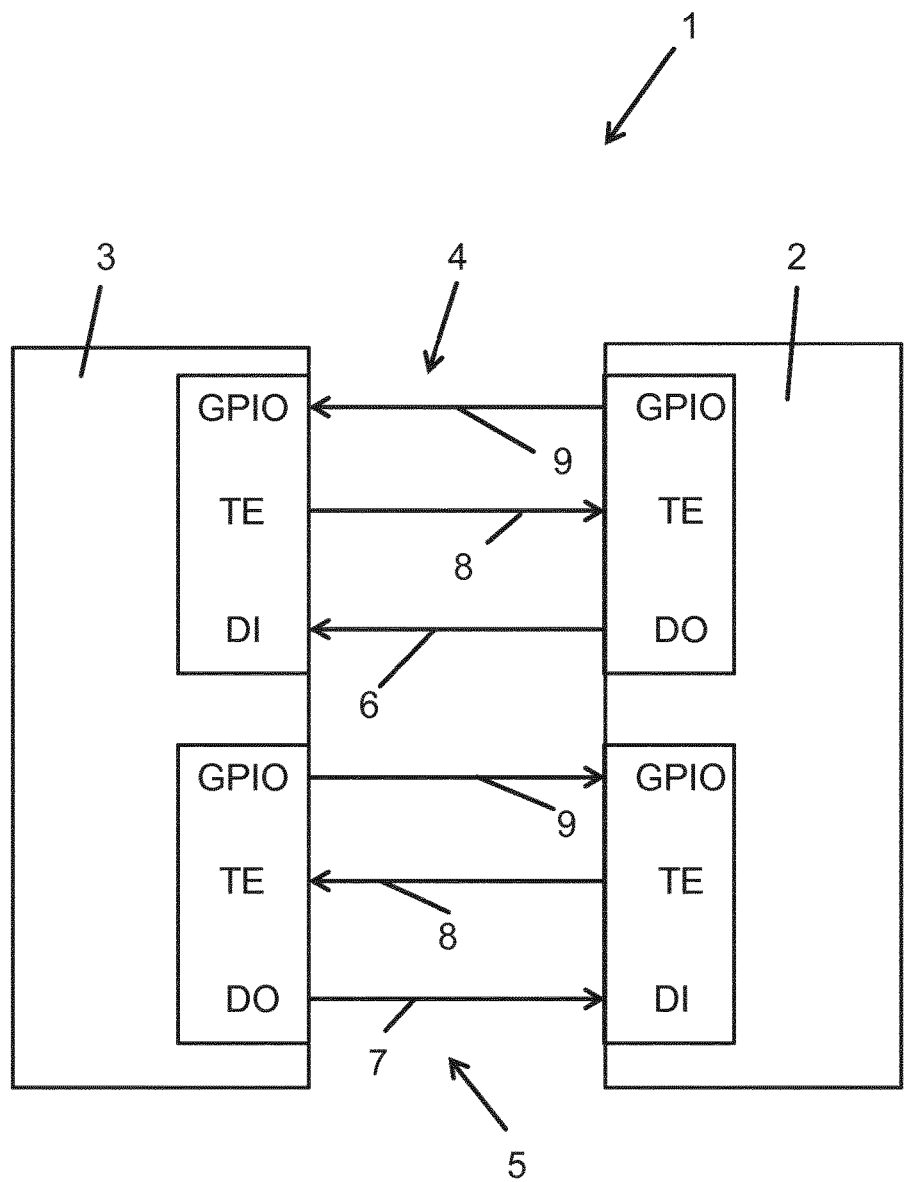

COMMUNICATION SYSTEM FOR INTER-CHIP COMMUNICATION

CROSS-REFERENCE TO RELATED APPLICATIONS

This is a U.S. national stage of application No. PCT/EP2014/070498, filed on 25 Sep. 2014, which claims priority to the German Application No. 10 2013 220 077.3 filed 2 Oct. 2013, the content of both incorporated herein by reference.

BACKGROUND OF THE INVENTION

1. Field of the Invention

The invention relates to a communication system for inter-chip communication in which processors communicate with one another via data channels of a communication bus, wherein a processor designated as a master processor assumes control of the transmission to the other processor designated as a slave processor.

2. Related Art

In this context, a bus system is already known for synchronous serial data transmission according to the master-slave principle, which is also referred to as a serial peripheral interface (SPI for short). This bus system has three common lines to which each participant is connected. These lines are an output for serial data, an input for serial data and a timer control (clock), which is defined by the master controlling the communication. A transmit enable line is furthermore provided between the master controlling the communication and the slave. The communication between the master and slave is effected bidirectionally and, according to the implementation of the protocol, is full-duplex-enabled. This requires many settings between the master and slave. The data protocols that enable the data flow and the data analysis on both sides of the communication partners are accordingly highly complex due to the bidirectional data transmission. The bidirectional data transmission can also result in an excessively high system load, particularly because the master and slave are able to, and must, transmit, receive and process data in parallel.

A substantial problem with this SPI bus consists in that the beginning of a message in the data flow is not known and may essentially start with any data bit.

Due to the complex protocol structure and the hardware-dependent implementation of the communication, proprietary communication solutions are often used for many processors, rendering an interoperability of different communication partners consisting of different hardware more or less impossible. The implementation of the SPI bus therefore always depends on the processors involved.

The problem with SPI inter-chip communication is therefore that both the SPI master controlling the communication flow and the SPI slave must be able to transmit, receive and process the data in parallel. This is a problem above all for the SPI slave, since it must always be ready to receive because the data transmission by the SPI master may, in principle, start at any time, i.e., with any bit. Even in the case of a data transmission by the SPI slave, the transmission flow is controlled by the SPI master. Consequently, the SPI slave must guarantee a continuous data flow in its data transmit register (controlled by the SPI master) as long as the data transmission from the SPI slave to the SPI master takes place. The protocols necessary for this purpose are complex and result in a high system load on the bus for inter-chip communication.

Furthermore, the implementation of the known SPI bus for inter-chip communication is strongly system-dependent, since there are many possible settings for the SPI bus. The reason for this is that the specifications for an SPI bus are not precisely defined and therefore many different, even mutually incompatible, devices exist. It may thus occur that a dedicated configuration of the SPI master is required for each connected circuit. The reason for this is, for example, that there is no uniform control for the communication direction or the communication of different participants. If a plurality of participants communicate simultaneously on one data channel, collisions frequently occur.

SUMMARY OF THE INVENTION

An object of the present invention application is to reduce the high system load in inter-chip communication and avoid the complex, different SPI bus protocols.

To meet this object, it is provided, in particular, in a communication system of the aforementioned type that a data channel is operated in each case in a separate physical communication bus for each data communication direction, i.e., the data transmission from a first to a second processor and the data from the second to the first processor. This results in a logical segregation of the two data channels for the different communication directions, which can thus operate logically independently from one another. This is achieved technically in the simplest manner by operating the two data channels on two different communication buses, which in each case preferably have an identical structure, so that the implementation of the two different data buses (at least one for each data communication direction) is, in principle, identical on each processor.

The solution proposed according to an aspect of the invention enables, for example, a communication in the one communication direction if data are simultaneously transmitted in the other communication direction, without resulting in a mixing of the data and therefore a collision preventing the communication, even without a complex data protocol controlling the bidirectional communication having to be provided. The communication in the one data channel of the communication bus can be designed simply as unidirectional, serial data transmission since each communication bus has a defined transmitter and a defined receiver.

In contrast to the known SPI bus, which provides a bidirectional communication, the communication in the communication bus according to an aspect of the invention is unidirectional. In order to enable a bidirectional communication between the two processors, a unidirectionally operated communication bus is provided in each case for each data communication direction, wherein the respectively unidirectionally transmitting communication buses of a different communication direction are in each case operated physically separately from one another. Overlaps of the different communication directions are thus prevented from the outset. Due to the simple serial nature of the data communication, the communication bus is also easily exchangeable and requires only minor adaptations to the platforms (hardware or processors) that are used.

According to a particularly preferred embodiment, it is provided that the receiver is designed in each case as the master processor controlling the communication for each separate communication bus. According to this embodiment, in order to control the communication, the master processor can, in particular, apply a signal to a transmit enable input of the slave processor. The slave processor is then (i.e., on detecting the transmit enable signal) configured to transmit the data stored in its transmit register serially until the signal is no longer present on the transmit enable input of the slave processor. The applied signal may, for example, be a 0-bit or a 1-bit signal. The receiver can thus control the transmission process and therefore the data flow and, for example, stop a transmission if the receiver is not ready to receive for whatever reason. As a result, the receiver processor can be of more simple design, since, for example, there is no need to ensure via a buffer memory that the data are initially received and stored at the transmission rate of the transmitter before the data can then be further processed. If a further processing of the data is not possible according to the invention, the receiver, as the master processor, can therefore simply stop the transmission.

In the unidirectionally operated communication bus, the transmitter is the only communication participant transmitting any data to be transmitted. It can therefore prepare the data as messages, for example data packets, and then place them in its transmit register when the data are completely prepared for transmission. The messages may, for example, be data packets in which a header and/or other relevant data for the message frame are added to the data. These data packets can then be prepared for transmission, for example by placing them in the transmit register.

According to one particularly preferred development of the proposed method, the slave processor, as the transmitter of the communication bus, is preferably configured to transmit a trigger signal to the master processor if data are pending for transmission by the slave processor. This can preferably take place when the data are completely prepared by the transmitter for transmission.

According to an aspect of the invention, this trigger signal can be applicable to a general input and output port of the master processor. A general input and output port of this type, which is also referred to as a GPIO input (General Purpose Input Output), is normally provided on each processor for a simple communication control, so that the proposed, easily performable and, in particular, serial communication can be implemented in a more or less hardware-independent manner between many different hardware processors. As soon as the master processor receives the trigger signal, the master processor can apply the transmit enable signal to the input of the slave processor.

In a simple communication flow that is more or less universally implementable in many different hardware processors, it can be provided that the master processor and the slave processor are configured to control the communication flow of the communication bus, transmitting according to the invention in one direction only, by an interrupt action in which the respective processor, i.e., the master or slave processor, is configured to interrupt the normal program flow and perform a process implemented, in particular, by software, if the processor receives an interrupt request. Interrupt requests of this type are also referred to as interrupts. The interrupt action is known as an interrupt service routine (ISR).

A corresponding interrupt action is provided by default in the vast majority of processors and is, for example, software-configurable. A universal implementation of the communication system proposed according to the invention is thus possible in a simple manner merely through a minimal hardware-related adaptation at processor and/or operating system level.

The interrupt action also removes a heavy workload from the communication system since the processes can be controlled in each case according to the work required without individual hardware components having to be designed for this purpose to perform communication flows imposed by other hardware components on the basis of time and/or data volume. As a result, the processors participating in the communication system can also be designed more economically.

Due to the communication flow on a more general level, it is thus possible in a simple manner to use different hardware bus systems for the communication, without independent protocols having to be implemented in each case. As a result, the code to be implemented for the respective hardware is largely hardware-independent and can be used on many platforms in an identical manner or with minimal adaptations. Only the respective operation-specific or function-specific and hardware-dependent parts of the software have to be adapted for each processor in the implementation, wherein, due to the universality of the communication flow, existing software can already be used as a design concept for other processors or operating systems.

Also as a result of the simple structure, the largest parts of the software can be used in an identical manner on the different platforms so that the level of verification is significantly increased and the testing requirement for the communication systems installed on different platforms is significantly reduced.

In order to maintain control of the communication, it can be provided that the slave processor is configured to receive a confirmation message from the master processor following the transmission of the data if the master processor has received the data. In the absence of a confirmation message of this type, which is also generally referred to as an acknowledgement, the slave processor can be configured to retransmit the data, in particular until the acknowledgement is received or, insofar as this is provided, a specific number of failed transmission attempts is exceeded. In the latter case, the transmission can be aborted in order to avoid unnecessarily overloading the communication system.

According to an aspect of the invention, the confirmation message can be transmitted in the opposite direction to that of the actual data communication in the communication bus from the master processor to the slave processor, i.e., from the receiver of the data to the transmitter of the data. This can also be simply implemented without a complex data protocol, since the transmission time of the confirmation message always occurs following the data transmission and therefore a fixed time window can be reserved in the data channel following each data transmission. This procedure is advantageous since the same data channel is used for both the acknowledgement and the actual data transmission.

Alternatively, however, it would also be conceivable for the confirmation message to be transmitted via the communication bus for the other communication data direction. This has the advantage that the hardware platforms are even more universally usable, since no opposite communication direction has to be reserved on the one transmission channel, and no precisely defined transmission conditions are required.

Further advantages, features and possible applications of the present invention can also be found in the following description of an example embodiment and the drawings. All described and/or graphically illustrated features, individually or in any combination, form the subject-matter of the present invention, also independently from their summary in the claims or their back-references.

BRIEF DESCRIPTION OF THE DRAWING

The single FIG. 1 shows a communication system 1 according to the invention between two processors 2, 3.

DETAILED DESCRIPTION OF THE PRESENTLY PREFERRED EMBODIMENTS

The communication system 1 between the two processors 2, 3 has a first communication bus 4 and a second communication bus 5. The first communication bus 4 is configured for the data transmission from the processor or chip 2, also referred to as the first processor, to the processor or chip 3, also referred to as the second processor. The second communication bus 5 is used for the data transmission from the second processor 3 to the first processor 2.

The communication buses 4, 5, each of which is used for one data communication direction, are configured in each case as physically segregated or separate from one another so that the first communication bus 4 has a data channel 6 from the first processor 2 to the second processor 3, and the second communication bus 5 has a data channel 7 from the second processor 3 to the first processor 2. A bidirectional communication can therefore take place between the processors 2, 3 by the two communication buses 4, 5, and each communication bus 4, 5 can be operated in a detached manner from the other communication bus 5, 4, for example by a serial data transmission. The data channel 6, 7 is formed in each case between a data output DO and a data input DI of the respective communication bus 4, 5.

In each case, the receiving processor 3, 2, i.e., the second processor 3 for the first communication bus 4 and the first processor 2 for the second communication bus 5, are configured as a master processor controlling the communication. The master processor controls the communication in that the receiver (master processor) applies a transmit enable signal 8 to the transmitter (slave processor) on the transmit enable input TE of the slave processor. This signal is generated on the transmit enable output TE of the master processor. The signal direction of the transmit enable signal 8 is therefore precisely the opposite of the data communication direction of the data channel 6, 7. As soon as the transmit enable signal 8 is present on the transmit enable input TE of the slave processor, the latter begins to transmit the data stored in a transmit memory (not shown) serially via the data channel 6, 7 to the master processor. The latter receives and further processes the data. If, for example the transmit memory of the master processor happens to be full, the latter can interrupt the transmit enable signal 8 and therefore stop the transmission of the data by the slave processor until sufficient storage capacity is again present in the receive memory of the master processor. The transmit enable signal 8 is then reactivated and the slave processor resumes the data transmission.

In order to indicate to the master processor that data to be transmitted are present, the slave processor, as the transmitter of the communication bus 4, 5, is configured to transmit a trigger signal 9 to the master processor. After receiving the trigger signal 9, the master processor applies the transmit enable signal 8 to the transmit enable input TE of the slave processor thus enabling the latter to transmit data in the data communication direction via the data channel 6, 7.

The trigger signal 9 is generated in each case between general inputs and outputs GPIO of the processors 2, 3, which are also referred to as the GPIO input or output (General Purpose Input Output). Corresponding TE and GPIO inputs/outputs are normally available as software-configurable inputs and outputs of the processors 2, 3, so that the communication flow of the communication system 1 proposed according to the invention can be configured in the same way in a more or less hardware-independent manner, and only the assignment of the processor pins (TE, GPIO) needs to be configured accordingly.

The proposed communication system 1 can therefore easily be implemented on different processors 2, 3, i.e., different hardware, without the entire communication protocol having to be implemented in a hardware-dependent manner.

Due to the physical segregation of the data channels 6, 7 for the two data communication directions of the communication buses 4, 5 between the two processors 2, 3, the two data transmission directions can be implemented in each case serially, for example in the sense of a First In/First Out (FIFO) or Last In/First Out (LIFO) transmission or the like, without a duplex-enabled transmission protocol having to be implemented. This also enables a simple communication control by the receiver, so that a high or excessively high workload of the individual processors 2, 3 can easily be avoided in the communication control, since the receiver processor, which is more susceptible to a high workload, is designed in each case as the master processor of the in any other disclosed or described or suggested form or embodiment as a general matter of design choice. It is the intention, therefore, to be limited only as indicated by the scope of the claims appended hereto.

The invention claimed is:

1. A communication system for inter-chip communication, comprising:
    a first processor;
    a second processor; and
    first and second communication buses arranged between the first and second processors,
    the first communication bus being configured to transmit communication data from the first processor, acting as a slave processor on the first communication bus, to the second processor, acting as a master processor on the first communication bus, the first communication bus having:
        a first trigger signal channel that communicates a first trigger signal from the first processor to the second processor indicating that the first processor has buffered communication data for transmission to the second processor,
        a first transmit enable channel that communicates a first transmit enable signal from the second processor, acting as the master processor on the first communication bus, to the first processor, acting as the slave processor on the first communication bus, indicating that first processor may transmit data to the second processor, and
        a first data channel, via which, in response to the first transmit enable signal from the second processor acting as the master processor on the first communication bus, communication data from the first processor to the second processor is transmitted;
    the second communication bus being configured to transmit communication data from the second processor, acting as the slave processor on the second communication bus, to the first processor, acting as the master processor on the second communication bus, the second communication bus having:
        a second trigger signal channel that communicates a second trigger signal from the second processor to the first processor indicating that the second processor has buffered communication data for transmission to the first processor,
a second transmit enable channel that communicates a second transmit enable signal from the first processor, acting as the master processor on the second communication bus, to the second processor, acting as the slave processor on the second communication bus, indicating that second processor may transmit data to the first processor, and
a second data channel, via which, in response to the second transmit enable signal from the first processor acting as the master processor on the second communication bus, communication data from the second processor to the first processor is transmitted;

wherein the one of the first and second processors acting as the master processor, assumes control of a transmission of communication data to the other one of the first and second processors, and wherein, for each separate one of said first and second communication buses, the one of said first and second processors that is receiving communication data over the respective second and first data channel, during communication on the particular one of the first and second communication buses functions, on that bus, as the master processor controlling communication.

2. The communication system as claimed in claim 1, wherein the trigger signal is configured to be applicable to a general input and output port (GPIO) of the one of the first and second processors configured as the master processor.

3. The communication system as claimed in claim 1, wherein the one of the first and second processors configured as the master processor and the one of the first and second processors configured as the slave processor are configured to control communication flow of the first and second communication bus by interrupt.

4. The communication system as claimed in claim 1, wherein the one of the first and second processors configured as the slave processor is configured to receive a confirmation message from the one of the first and second processors configured as the master processor following the transmission of the communication data.

5. The communication system as claimed in claim 4, wherein the confirmation message is transmitted in a direction opposite to that of the data communication in the first and second communication buses from the one of the first and second processors configured as the master processor to the one of the first and second processors configured as the slave processor.

* * * * *